(12) United States Patent
Yagi et al.

(10) Patent No.: US 11,699,923 B2
(45) Date of Patent: Jul. 11, 2023

(54) POWER RECEIVER APPARATUS, POWER TRANSMISSION VOLTAGE CONTROL METHOD, AND UNDERWATER POWER SUPPLY SYSTEM

(71) Applicant: PANASONIC CORPORATION, Osaka (JP)

(72) Inventors: Tatsuo Yagi, Fukuoka (JP); Shuichiro Yamaguchi, Fukuoka (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 0 days.

(21) Appl. No.: 17/535,858

(22) Filed: Nov. 26, 2021

(65) Prior Publication Data
US 2022/0173619 A1 Jun. 2, 2022

(30) Foreign Application Priority Data
Nov. 30, 2020 (JP) .................................. 2020-198636

(51) Int. Cl.
*H02J 50/12* (2016.01)
*B60L 53/12* (2019.01)
(Continued)

(52) U.S. Cl.
CPC .............. *H02J 50/12* (2016.02); *B60L 53/12* (2019.02); *H02J 7/04* (2013.01); *H02J 50/40* (2016.02); *H02J 50/80* (2016.02)

(58) Field of Classification Search
None
See application file for complete search history.

(56) References Cited

U.S. PATENT DOCUMENTS

| 2012/0212150 A1* | 8/2012 | Lakirovich | ............ H05B 45/20 |
| | | | 315/250 |
| 2014/0232200 A1 | 8/2014 | Maekawa | |

(Continued)

FOREIGN PATENT DOCUMENTS

| CN | 105703458 A | * | 6/2016 | ................ H02J 7/02 |
| CN | 114578835 A | * | 6/2022 | |

(Continued)

*Primary Examiner* — Daniel Kessie
*Assistant Examiner* — Terrence R Willoughby
(74) *Attorney, Agent, or Firm* — Greenblum & Bernstein, P.L.C.

(57) ABSTRACT

A power receiver apparatus is movable under water. The power receiver apparatus includes: a power receiver device configured to receive power wirelessly transmitted from a power transmitter apparatus; a power supply device including a storage battery and configured to charge the storage battery based on received power received by the power receiver device; a first sensor configured to detect a rectified voltage value rectified based on the received power; a second sensor configured to detect a charging current value to the storage battery charged by the power supply device; a processor configured to determine a power transmission voltage value corresponding to the power wirelessly transmitted from the power transmitter apparatus based on the rectified voltage value and the charging current value; and a communication device configured to transmit the power transmission voltage value determined by the processor to the power transmitter apparatus.

6 Claims, 7 Drawing Sheets

(51) Int. Cl.
    *H02J 50/40*     (2016.01)
    *H02J 50/80*     (2016.01)
    *H02J 7/04*     (2006.01)

(56) References Cited

U.S. PATENT DOCUMENTS

| | | | |
|---|---|---|---|
| 2015/0333540 A1* | 11/2015 | Niizuma | H02J 50/90 114/312 |
| 2021/0006339 A1 | 1/2021 | Eguchi et al. | |
| 2021/0221241 A1* | 7/2021 | Yamamoto | H02J 50/005 |
| 2021/0281328 A1 | 9/2021 | Eguchi et al. | |
| 2022/0045536 A1* | 2/2022 | Nagano | H02J 50/12 |

FOREIGN PATENT DOCUMENTS

| | | | |
|---|---|---|---|
| JP | 2015-015901 | | 1/2015 |
| JP | 2019-176316 | | 10/2019 |
| KR | 20220020531 A | * | 8/2020 |
| KR | 102431067 B1 | * | 8/2022 |
| RU | 2744064 C1 | * | 3/2021 |

* cited by examiner

FIG. 6

| CHARGING CURRENT | 0~I1 | I1~I2 | I2~I3 | I3~I4 | I4~ |
|---|---|---|---|---|---|
| POWER TRANSMISSION VOLTAGE | V1 | V2 | V3 | V4 | V5 |

POWER RECEIVER APPARATUS, POWER TRANSMISSION VOLTAGE CONTROL METHOD, AND UNDERWATER POWER SUPPLY SYSTEM

CROSS-REFERENCE TO RELATED APPLICATIONS

This application is based on and claims the benefit of priority of Japanese Patent Application No. 2020-198636 filed on Nov. 30, 2020, the entire contents of which are incorporated herein by reference.

FIELD

The present disclosure relates to a power receiver apparatus, a power transmission voltage control method, and an underwater power supply system.

BACKGROUND

JP-A-2015-015901 discloses a power transmitter apparatus (for example, an underwater base station) that transmits power underwater in a non-contact manner with a power receiver apparatus (for example, an underwater vehicle) by using a magnetic resonance method. The power transmitter apparatus includes a power transmitter resonance coil, a balloon, and a balloon control mechanism. The power transmitter resonance coil transmits the power to a power receiver resonance coil of the power receiver apparatus in the non-contact manner by using the magnetic resonance method. The balloon includes the power transmitter resonance coil therein. The balloon control mechanism removes water between the power transmitter resonance coil and the power receiver resonance coil by expanding the balloon during power transmission.

SUMMARY

Here, it is assumed that power is transmitted from a power transmitter apparatus to a power receiver apparatus under water as in JP-A-2015-015901. When a DC/DC power supply is adopted as a charging power supply in an underwater vehicle (that is, the power receiver apparatus) such as an autonomous underwater vehicle (AUV), an input voltage supplied to the DC/DC power supply via a rectifier mounted on the power receiver apparatus (that is, a rectifier that converts an AC voltage induced in the power receiver apparatus on a secondary side into a DC voltage) varies in accordance with a charging current in the power receiver apparatus. On the other hand, the charging current needs to be increased in a stepwise manner from the start of charging, and needs to be appropriately changed in accordance with a state of a storage battery (so-called battery) mounted in the power receiver apparatus. Therefore, in consideration of a timely variation of the charging current, when the input voltage cannot be controlled within an appropriate range, voltage conversion efficiency of the DC/DC power supply may be decreased or a rating of use may not be satisfied (for example, an operation is stopped).

The present disclosure has been made in view of the above situation in the related art, and provides a power receiver apparatus, a power transmission voltage control method, and an underwater power supply system that appropriately control a power transmission voltage from a primary side to a secondary side in accordance with a charging current to a mounted storage battery and prevent efficiency deterioration of a DC/DC power supply on the secondary side.

The present disclosure provides a power receiver apparatus movable under water, the power receiver apparatus including: a power receiver device configured to receive power wirelessly transmitted from a power transmitter apparatus under the water; a power supply device including a storage battery and configured to charge the storage battery based on received power received by the power receiver device; a first sensor configured to detect a rectified voltage value rectified based on the received power; a second sensor configured to detect a charging current value to the storage battery charged by the power supply device; a processor configured to determine a power transmission voltage value corresponding to the power wirelessly transmitted from the power transmitter apparatus based on the rectified voltage value detected by the first sensor and the charging current value detected by the second sensor; and a communication device configured to transmit the power transmission voltage value determined by the processor to the power transmitter apparatus.

The present disclosure provides a power transmission voltage control method performed by a power receiver apparatus movable under water, the power transmission voltage control method including: receiving power wirelessly transmitted from a power transmitter apparatus under the water; charging, in a power supply device including a storage battery, the storage battery based on received power; detecting a rectified voltage value rectified based on the received power; detecting a charging current value to the storage battery charged by the power supply device; determining a power transmission voltage value corresponding to the power wirelessly transmitted from the power transmitter apparatus based on the rectified voltage value and the charging current value; and transmitting the power transmission voltage value to the power transmitter apparatus.

The present disclosure provides an underwater power supply system including: a power receiver apparatus movable under water; and a power transmitter apparatus, wherein the power receiver apparatus includes: a power receiver device configured to receive power wirelessly transmitted from the power transmitter apparatus under the water; a power supply device including a storage battery and configured to charge the storage battery based on received power received by the power receiver device; a first sensor configured to detect a rectified voltage value rectified based on the received power; a second sensor configured to detect a charging current value to the storage battery charged by the power supply device; a processor configured to determine a power transmission voltage value corresponding to the power wirelessly transmitted from the power transmitter apparatus based on the rectified voltage value detected by the first sensor and the charging current value detected by the second sensor; and a communication device configured to transmit the power transmission voltage value determined by the processor to the power transmitter apparatus, and wherein the power transmitter apparatus is configured to control the power to be wirelessly transmitted to the power receiver apparatus based on the power transmission voltage value transmitted from the power receiver apparatus.

According to the present disclosure, it is possible to appropriately control a power transmission voltage from a primary side to a secondary side in accordance with a charging current to a mounted storage battery and prevent efficiency deterioration of a DC/DC power supply on the secondary side.

BRIEF DESCRIPTION OF DRAWINGS

FIG. 6 is a table showing an example of a correspondence relationship between a charging current value detected by a current sensor and a power transmission voltage control value to be notified to the power transmitter apparatus.

DETAILED DESCRIPTION

Hereinafter, an embodiment specifically disclosing a power receiver apparatus, a power transmission voltage control method, and an underwater power supply system according to the present disclosure will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. The accompanying drawings and the following description are provided for a thorough understanding of the present disclosure for those skilled in the art, and are not intended to limit the subject matter in the claims.

Figure 1:
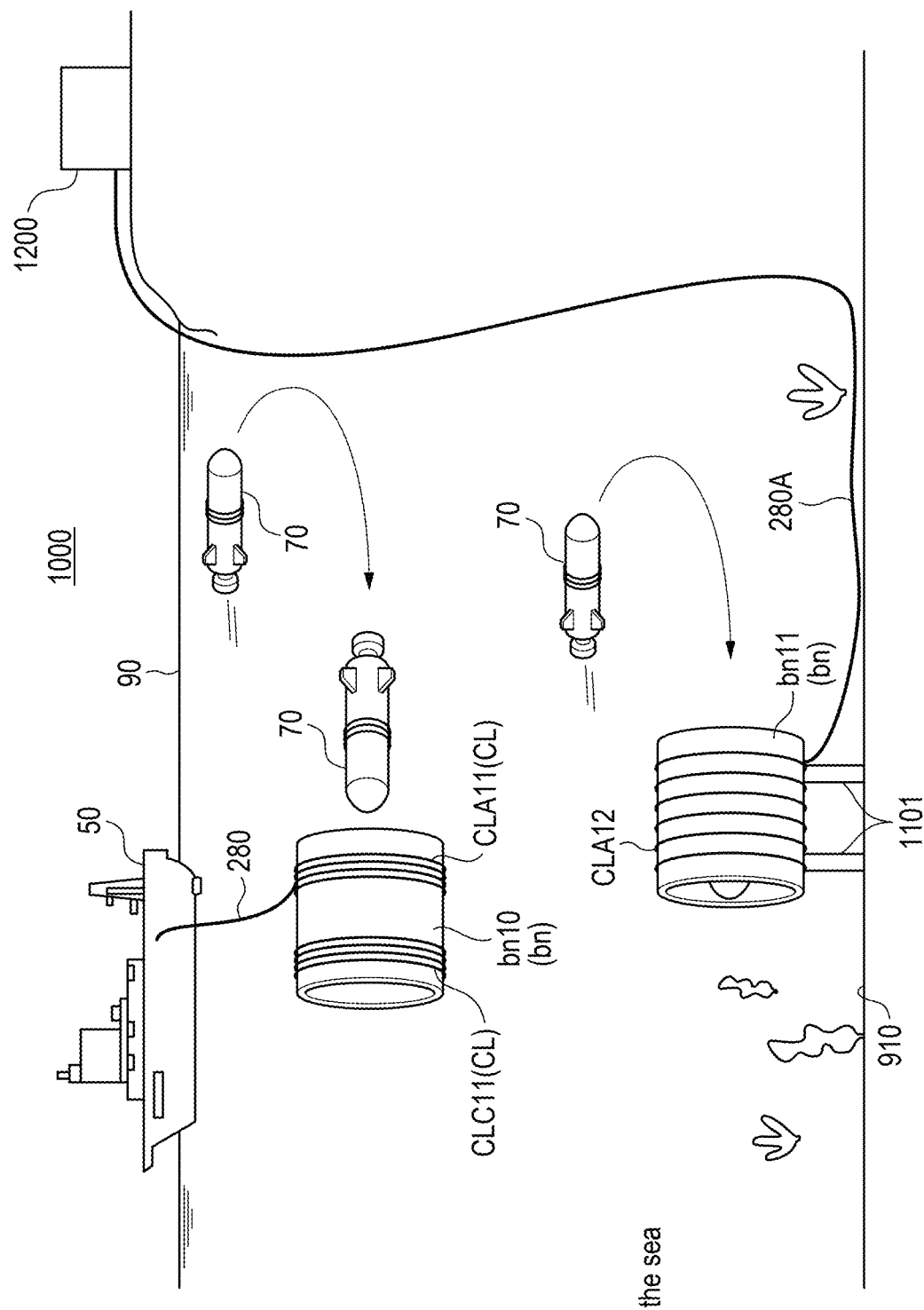
FIG. 1 is a diagram schematically showing an example of a use environment in which an underwater power supply system according to a first embodiment is installed.

FIG. 1 is a diagram schematically showing an example of a use environment in which an underwater power supply system 1000 according to a first embodiment is installed. The underwater power supply system 1000 includes a power transmitter apparatus 100, a power receiver apparatus 200, and a plurality of coils CL (see FIG. 2). The power transmitter apparatus 100 wirelessly (that is, contactlessly) transmits power to the power receiver apparatus 200 via the plurality of coils CL in accordance with a magnetic resonance method. The number of coils CL to be disposed is n (n is an integer of 2 or more), and can be freely set.

Each of the coils CL is formed into, for example, an annular shape, and is insulated by being covered with a resin cover. The coil CL is formed of, for example, a cab tire cable, a helical coil, or a spiral coil. The helical coil is an annular coil that is wound not in the same plane and is spirally wound along a transmission direction of the power by the magnetic resonance method. The spiral coil is an annular coil formed in a spiral shape in the same plane. It is possible to reduce a thickness of the coil CL by adopting the spiral coil. It is possible to secure a large space inside the wound coil CL by adopting the helical coil. FIG. 1 illustrates an example of the spiral coil.

The coils CL used for power transfer include a power transmitter coil CLA and a power receiver coil CLB. The power transmitter coil CLA is a primary coil. The power receiver coil CLB is a secondary coil. The coils CL may include at least one relay coil CLC (booster coil) disposed between the power transmitter coil CLA and the power receiver coil CLB. The relay coil CLC is an example of the power transmitter coil. When there are a plurality of relay coils CLC, the relay coils CLC are disposed substantially parallel to one another, and half or more of opening surfaces formed by the relay coils CLC overlap one another. An interval between the plurality of relay coils CLC is ensured to be equal to or larger than, for example, a radius of the relay coil CLC. The relay coils CLC assist the power transmitter performed by the power transmitter coil CLA.

Figure 2:
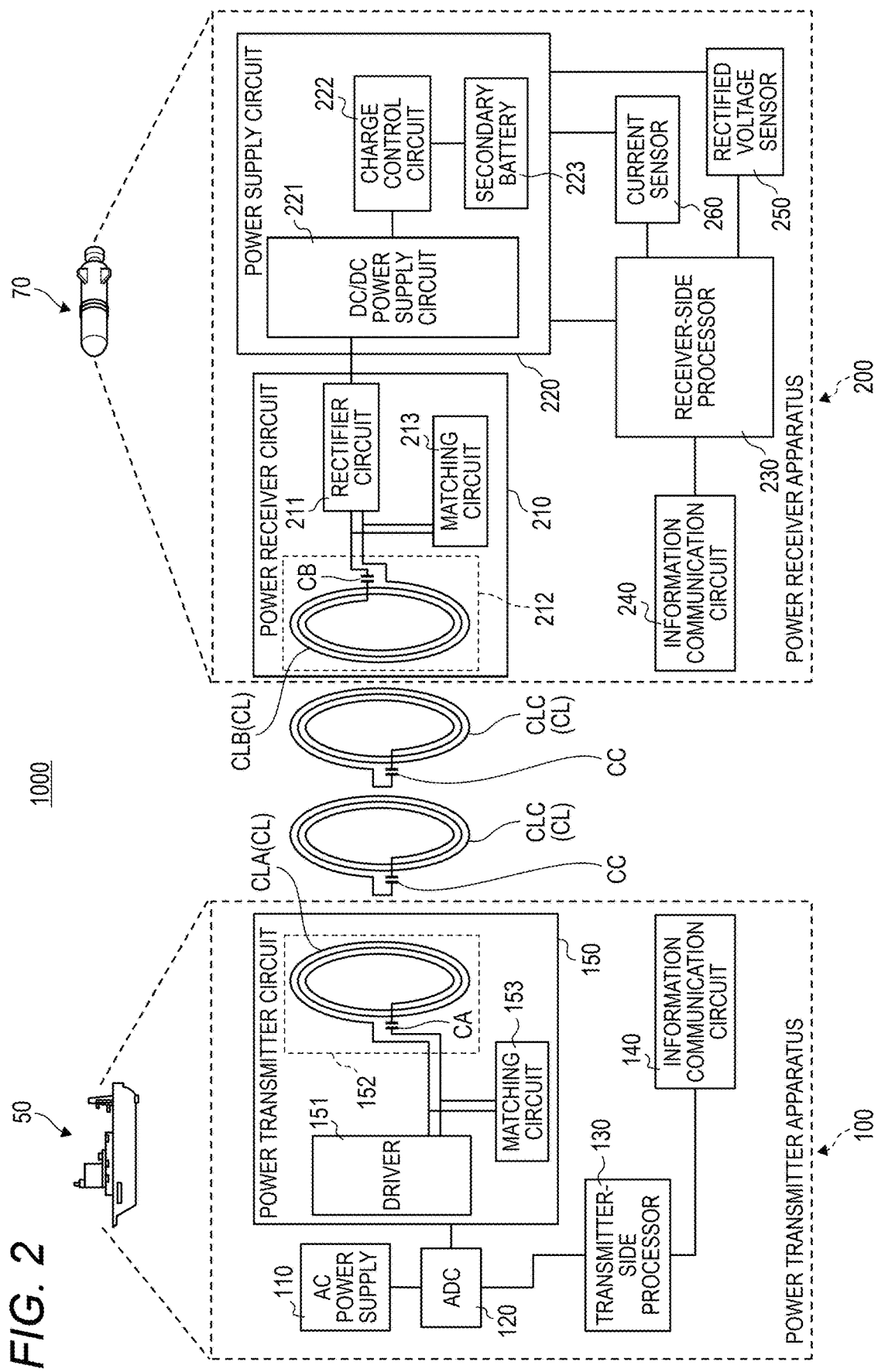
FIG. 2 is a diagram showing a hardware configuration example of the underwater power supply system according to the first embodiment.

The power transmitter coil CLA is provided in the power transmitter apparatus 100 (see FIG. 2). The power receiver coil CLB is provided in the power receiver apparatus 200 (see FIG. 2). The relay coils CLC may be provided in the power transmitter apparatus 100, may be provided in the power receiver apparatus 200, or may be provided separately from the power transmitter apparatus 100 and the power receiver apparatus 200. Alternatively, a part of the relay coils CLC may be provided in the power transmitter apparatus 100, and the other relay coils CLC may be provided in the power receiver apparatus 200.

A part of the power transmitter apparatus 100 may be provided in a ship 50, the other part of the power transmitter apparatus 100 may be provided in, for example, a power supply facility 1200 installed on land. The power receiver apparatus 200 may be set in a movable underwater vehicle 70 (for example, an underwater watercraft or an underwater excavator), or may be installed in a fixed underwater facility (for example, a seismometer, a monitoring camera, or a geothermal power generator). FIG. 1 illustrates the underwater watercraft as an example of the underwater vehicle 70. The coils CL are disposed underwater (for example, under sea).

Examples of the underwater vehicle 70 may be a remotely operated vehicle (ROV), an unmanned underwater vehicle (UUV), and an autonomous underwater vehicle (AUV).

A part of the ship 50 is present above a water surface 90 (for example, a sea surface), that is, above the water, and the other part of the ship 50 is present below the water surface 90, that is, under the water (for example, under the sea). The ship 50 is movable above the water (for example, on the sea). For example, the ship 50 is freely movable above the water at a data acquisition location (for example, on the sea). The power transmitter apparatus 100 installed in the ship 50 and the power transmitter coil CLA are connected to each other by a power cable 280. The power cable 280 is connected to a driver 151 in the power transmitter apparatus 100 (see FIG. 2) via a connector above the water.

The underwater vehicle 70 submerges under the water, and is freely movable to a predetermined data acquisition point based on an instruction from the ship 50. The instruction from the ship 50 may be transmitted by communication via the coils CL, or may be transmitted using other communication methods.

The coils CL are disposed, for example, at equal intervals. A distance (coil interval) between adjacent coils CL is, for example, 5 m. For example, the coil interval has a length equal to about half of a diameter of the coil CL. A transmission frequency is, for example, 40 kHz or less and is preferably less than 10 kHz in consideration of attenuation of a magnetic field strength under the water (for example, under the sea). When the power transmission is performed at the transmission frequency of 10 kHz or more, it is required to perform a predetermined simulation based on provisions of the Radio Act. When the transmission frequency is less than 10 kHz, the simulation can be omitted. When the transmission frequency becomes lower, a power transmission distance becomes longer, the coil CL becomes larger, and the coil interval becomes larger. For example, when communication signals are superimposed, the transmission frequency may be a frequency higher than 40 kHz.

The transmission frequency is determined based on coil characteristics such as an inductance of the coil CL, a diameter of the coil CL, and the number of turns of the coil CL. The diameter of the coil CL is, for example, several meters to several tens of meters. When a thickness of the coil CL increases, that is, when a wire diameter of the coil CL increases, electrical resistance in the coil CL decreases, and power loss decreases. The power transmitted via the coil CL is, for example, 50 W or more, and may be on an order of kW.

The power transmitter apparatus 100 may include one or more bobbins bn around which the wire of the coil is wound. A material of the bobbin bn may use a non-conductive or weak magnetic material (for example, a resin such as polyvinyl chloride, acrylic, and polyester). The material of the bobbin bn may have dielectric property. For example, when polyvinyl chloride is used as the material of the bobbin bn, the bobbin bn is inexpensive, easily available, and easily processed. Since the bobbin bn is non-conductive, a magnetic field generated due to an alternating current (AC) flowing through the coil CL can be prevented from being absorbed by the bobbin bn in the power transmitter apparatus 100. In FIG. 1, in order to supply the power under the water (for example, supply the power under the sea), there are provided a power supply stand including a bobbin bn10 that floats under the water and a power supply stand including a bobbin bn11 disposed on a seabed.

In the power supply stand including the bobbin bn10, a power transmitter coil CLA11 and a relay coil CLC11 are wound around an outer periphery of the cylindrical bobbin bn10. The power cable 280 is connected to the power transmitter coil CLA11. The power is supplied, via the power cable 280, to the power transmitter coil CLA11 from the ship 50 mooring on the sea. The power cable 280 supports the power supply stand in a floating state under the sea. In the floating state, openings on two sides of the cylindrical bobbin bn10 may be oriented in a horizontal direction. The underwater vehicle 70 may enter, in the horizontal direction, an entrance and exit of the power supply stand in the floating state and stay inside the bobbin bn10 to receive the power.

The power supply stand including the bobbin bn11 is fixed to upper portions of two pillars 1101 embedded in a seabed 910. The entrance and exit of the power supply stand may be oriented in the horizontal direction. In the power supply stand, the power transmitter coil CLA12 is wound around the cylindrical bobbin bn11, whereas the relay coil CLC is not disposed. For example, a power cable 280A extending along the seabed 910 may be connected to the power transmitter coil CLA12. The power may be supplied from the power supply facility 1200 via the power cable 280A. The underwater vehicle 70 may enter, in the horizontal direction, the entrance and exit of the power supply stand installed on the seabed 910 and stay inside the bobbin bn11 to receive the power.

FIG. 2 is a diagram showing a hardware configuration example of the underwater power supply system 1000 according to the first embodiment. As described above, the underwater power supply system 1000 includes a power transmitter apparatus 100, a power receiver apparatus 200, and a plurality of coils CL.

The power transmitter apparatus 100 includes an AC power supply 110, an AC/DC converter (ADC) 120, a transmitter-side processor 130, an information communication circuit 140, and a power transmitter circuit 150.

The ADC 120 converts, based on an instruction from the transmitter-side processor 130, AC power supplied from the AC power supply 110, which is an example of a power supply for power transmission, into DC power corresponding to a power transmission voltage control value from the transmitter-side processor 130. The converted DC power is transmitted to the power transmitter circuit 150.

The transmitter-side processor 130 is configured by using, for example, a central processing unit (CPU), and integrally controls an operation of each unit of the power transmitter apparatus 100 (for example, the AC power supply 110, the ADC 120, the information communication circuit 140, and the power transmitter circuit 150).

The information communication circuit 140 as an example of a communication device includes, for example, a PLC adapter corresponding to power line communication (PLC) communication and a modulation and demodulation circuit for modulating or demodulating communication data communicated between the power transmitter apparatus 100 and the power receiver apparatus 200. The modulation/demodulation circuit may be provided in the PLC adapter. A configuration example of the PLC adapter is disclosed in, for example, JP-A-2019-176316. The information communication circuit 140 transmits, for example, control information from the power transmitter apparatus 100 to the power receiver apparatus 200 via the PLC adapter (not shown) and the coil CL. The information communication circuit 140 receives, for example, data from the power receiver apparatus 200 to the power transmitter apparatus 100 via the coil CL and the PLC adapter. The data includes, for example, data on an exploration result obtained by underwater exploration or bottom exploration by the underwater vehicle 70. The information communication circuit 140 can quickly perform data communication with the underwater vehicle 70 (in other words, the power receiver apparatus 200) while the underwater vehicle 70 performs work such as data collection.

The power transmitter circuit 150 includes the driver 151, a resonance circuit 152, and a matching circuit 153. The driver 151 converts the DC power from the ADC 120 into an AC voltage of a predetermined frequency (for example, a pulse waveform). The resonance circuit 152 includes a capacitor CA and a power transmitter coil CLA, and generates an AC voltage having a sinusoidal waveform based on the AC voltage having the pulse waveform from the driver 151. The power transmitter coil CLA resonates at a predetermined resonance frequency in accordance with the AC voltage applied from the driver 151. The power transmitter coil CLA is impedance-matched to an output impedance of the power transmitter apparatus 100 by the matching circuit 153.

A frequency of the AC voltage obtained by conversion by the driver 151 corresponds to a transmission frequency of power transmission between the power transmitter apparatus 100 and the power receiver apparatus 200, and corresponds to a resonance frequency. The transmission frequency may be set based on, for example, a Q value of each coil CL.

The power receiver apparatus 200 includes a power receiver circuit 210, a power supply circuit 220, a receiver-side processor 230, an information communication circuit 240, a rectified voltage sensor 250, and a current sensor 260.

The power receiver circuit 210 as an example of a power receiver device includes a rectifier circuit 211, a resonance circuit 212, and a matching circuit 213. The rectifier circuit 211 converts the AC power induced in the power receiver coil CLB into DC power and supplies a DC voltage (in other words, a rectified voltage) as a power source to the power supply circuit 220. The resonance circuit 212 includes a capacitor CB and the power receiver coil CLB, and receives the AC power transmitted from the power transmitter coil CLA. The power receiver coil CLB is impedance-matched to an input impedance of the power receiver apparatus 200 by the matching circuit 213.

The power supply circuit 220 as an example of a power supply device includes a DC/DC power supply circuit 221, a charging control circuit 222, and a secondary battery 223 as an example of a storage battery. The DC/DC power supply circuit 221 configures a power supply circuit in which one or more general-purpose circuit components (for example, a DC/DC converter) are used as a power supply for charging the secondary battery 223 in the underwater power supply system 1000. The DC/DC power supply circuit 221 boosts or lowers the DC voltage (rectified voltage) from the power receiver circuit 210 and supplies the DC voltage to the charging control circuit 222. Based on the DC power supply voltage (rectified voltage) supplied from the DC/DC power supply circuit 221, the charging control circuit 222 controls charging or discharging of the secondary battery 223 by supplying a charging current corresponding to a type of the secondary battery 223 to the secondary battery 223. The secondary battery 223 as an example of the storage battery stores the power transmitted from the power transmitter apparatus 100. The secondary battery 223 is, for example, a lithium ion battery.

Figure 4:
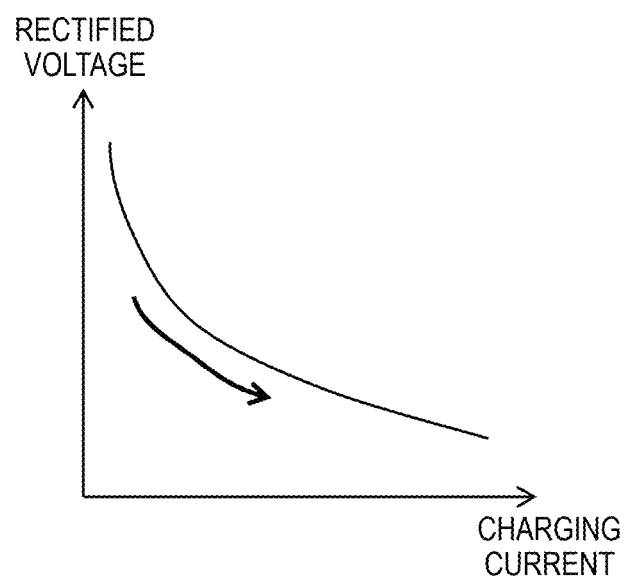
FIG. 4 is a graph showing a characteristic example of a rectified voltage with respect to a charging current in a power receiver apparatus.
Figure 5:
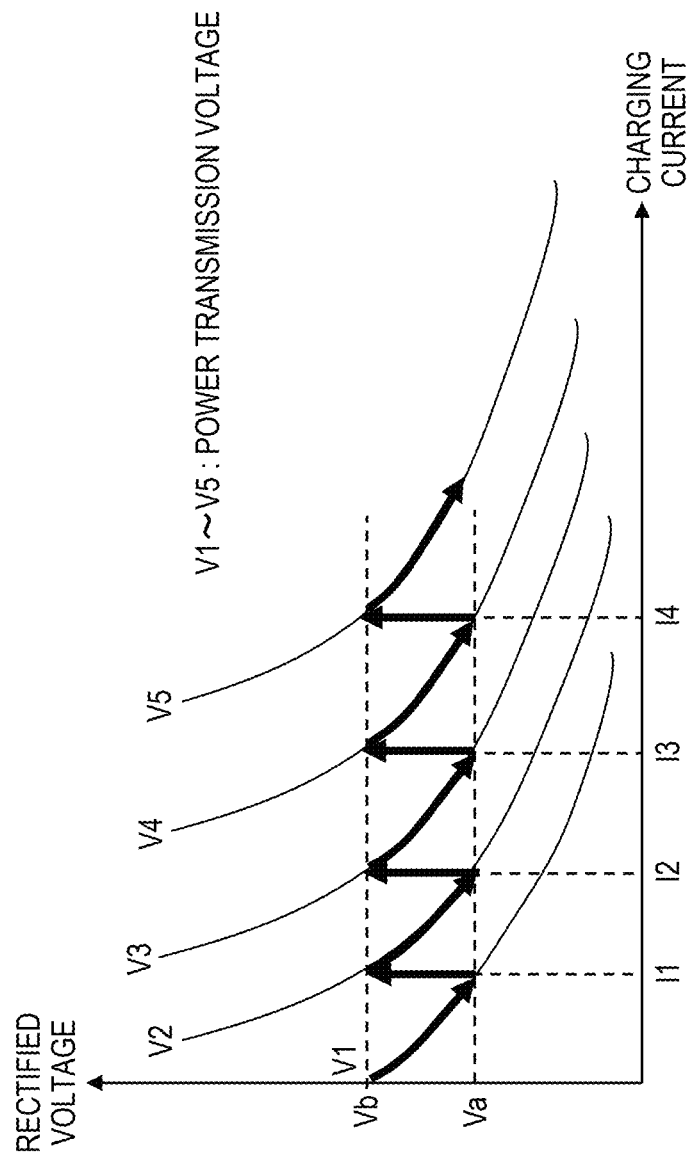
FIG. 5 is a graph showing a characteristic example of the rectified voltage with respect to the charging current in the power receiver apparatus for each power transmission voltage from a power transmitter apparatus.

Here, a characteristic example between a charging current value and a rectified voltage value in the power receiver apparatus 200 according to the first embodiment will be described with reference to FIGS. 4 and 5. FIG. 4 is a graph showing a characteristic example of the rectified voltage with respect to the charging current in the power receiver apparatus 200. FIG. 5 is a graph showing a characteristic example of the rectified voltage with respect to the charging current in the power receiver apparatus 200 for each power transmission voltage from the power transmitter apparatus 100. In each of FIGS. 4 and 5, a horizontal axis represents the charging current value. In each of FIGS. 4 and 5, a vertical axis represents the rectified voltage value.

As shown in FIG. 4, in the underwater power supply system 1000 according to the first embodiment, when the power transmission voltage from a primary side (that is, the power transmitter apparatus 100) is constant, when the charging current of the power receiver apparatus 200 increases, a characteristic PTY1 is seen in which the DC voltage supplied to the power supply circuit 220 via the rectifier circuit 211 (in other words, the rectified voltage) decreases. As shown in FIG. 5, when the power transmission voltages are V1, V2, V3, V4, and V5 (V1<V2<V3<V4<V5), a characteristic similar to that in FIG. 4 (that is, the characteristic in which the DC voltage decreases as the charging current increases) is observed. In FIG. 5, Va and Vb are reference voltage values that are a lower limit and an upper limit of an appropriate operation range in which efficiency of the DC/DC power supply circuit 221 is the highest. That is, when the rectified voltage value is between the reference voltage values Va and Vb, the efficiency of the DC/DC power supply circuit 221 is the highest.

Therefore, in the first embodiment, when the rectified voltage value of the power receiver apparatus 200 is not between the reference voltage values Va and Vb so that the efficiency of the DC/DC power supply circuit 221 of the power supply circuit 220 is the highest, the power receiver apparatus 200 variably controls the power transmission voltage from the primary side (that is, the power transmitter apparatus 100) in accordance with the charging current detected in the power supply circuit 220. For example, when the rectified voltage value is not between the reference voltage values Va and Vb and the charging current value is between "0" and "I1", the power receiver apparatus 200 determines the power transmission voltage control value so that the power transmission voltage from the primary side (that is, the power transmitter apparatus 100) is "V1" (see FIG. 6). Accordingly, the power receiver apparatus 200 can prevent the deterioration of the efficiency of the DC/DC power supply circuit 221 of the power supply circuit 220.

The receiver-side processor 230 is configured by using, for example, a CPU, and controls charging or discharging of the secondary battery 223 by the power supply circuit 220 of the power receiver apparatus 200. For example, the receiver-side processor 230 executes, based on detection values (refer to the following description) of the rectified voltage and the charging current described above, periodic interrupt processing for periodically controlling the rectified voltage in feedback control from the power receiver apparatus 200 to the power transmitter apparatus 100 (see FIG. 7) is executed. The periodic interrupt processing is executed, for example, every 10 ms. Details of the receiver-side processor 230 will be described later with reference to FIG. 3.

The information communication circuit 240 as an example of the communication device includes, for example, a PLC adapter corresponding to PLC communication, and a modulation and demodulation circuit for modulating or demodulating communication data communicated between the power receiver apparatus 200 and the power transmitter apparatus 100. The modulation/demodulation circuit may be provided in the PLC adapter. The configuration example of the PLC adapter is disclosed in, for example, JP-A-2019-176316. The information communication circuit 240 receives, for example, control information from the power transmitter apparatus 100 to the power receiver apparatus 200 via the coil CL and the PLC adapter. The information communication circuit 240 transmits, for example, data from the power receiver apparatus 200 to the power transmitter apparatus 100 via the PLC adapter and the coil CL. The data includes, for example, data on an exploration result obtained by underwater exploration or bottom exploration by the underwater vehicle 70. The information communication circuit 240 can quickly perform the data communication with the ship 50 (in other words, the power transmitter apparatus 100) while the underwater vehicle 70 performs the work such as the data collection.

The rectified voltage sensor 250 as an example of a first sensor detects the DC voltage (in other words, the rectified voltage) supplied from the power receiver circuit 210 to the power supply circuit 220 in synchronization with a timing of the above periodic interrupt processing, and sends the detected DC voltage to the receiver-side processor 230.

The current sensor 260 as an example of a second sensor detects the current (that is, the charging current) supplied to the secondary battery 223 by the charging control circuit 222 of the power supply circuit 220 in synchronization with the timing of the above periodic interrupt processing, and sends the current to the receiver-side processor 230.

Similar to the power transmitter coil CLA and the power receiver coil CLB, the relay coil CLC configures a resonance circuit together with a capacitor CC. That is, in the present embodiment, resonance circuits are disposed in multiple stages under the water, so that the power is transmitted using the magnetic resonance method.

Here, the power transmission from the power transmitter apparatus 100 to the power receiver apparatus 200 will be briefly described with reference to FIG. 2.

In the resonance circuit 152 of the power transmitter apparatus 100, when a current flows through the power transmitter coil CLA of the power transmitter apparatus 100, a magnetic field is generated around the power transmitter coil CLA. Vibration of the generated magnetic field is transmitted to a resonance circuit including the relay coil CLC that resonates at the same frequency as the resonance frequency of the resonance circuit 152.

In the resonance circuit including the relay coil CLC, a current is excited in the relay coil CLC due to the vibration of the magnetic field. The current flows, and a magnetic field is further generated around the relay coil CLC. The vibration of the generated magnetic field is transmitted to a resonance circuit including other relay coil CLC that resonates at the same frequency as the resonance frequency of the resonance circuit 152 and the resonance circuit 212 including the power receiver coil CLB.

In the resonance circuit 212 of the power receiver apparatus 200, the AC power is induced in the power receiver coil CLB by vibration of the magnetic field of the relay coil CLC. The induced AC power is rectified by the rectifier circuit 211, converted into a predetermined voltage in the power supply circuit 220, and a charging current flows, so that the secondary battery 223 is charged.

Figure 3:
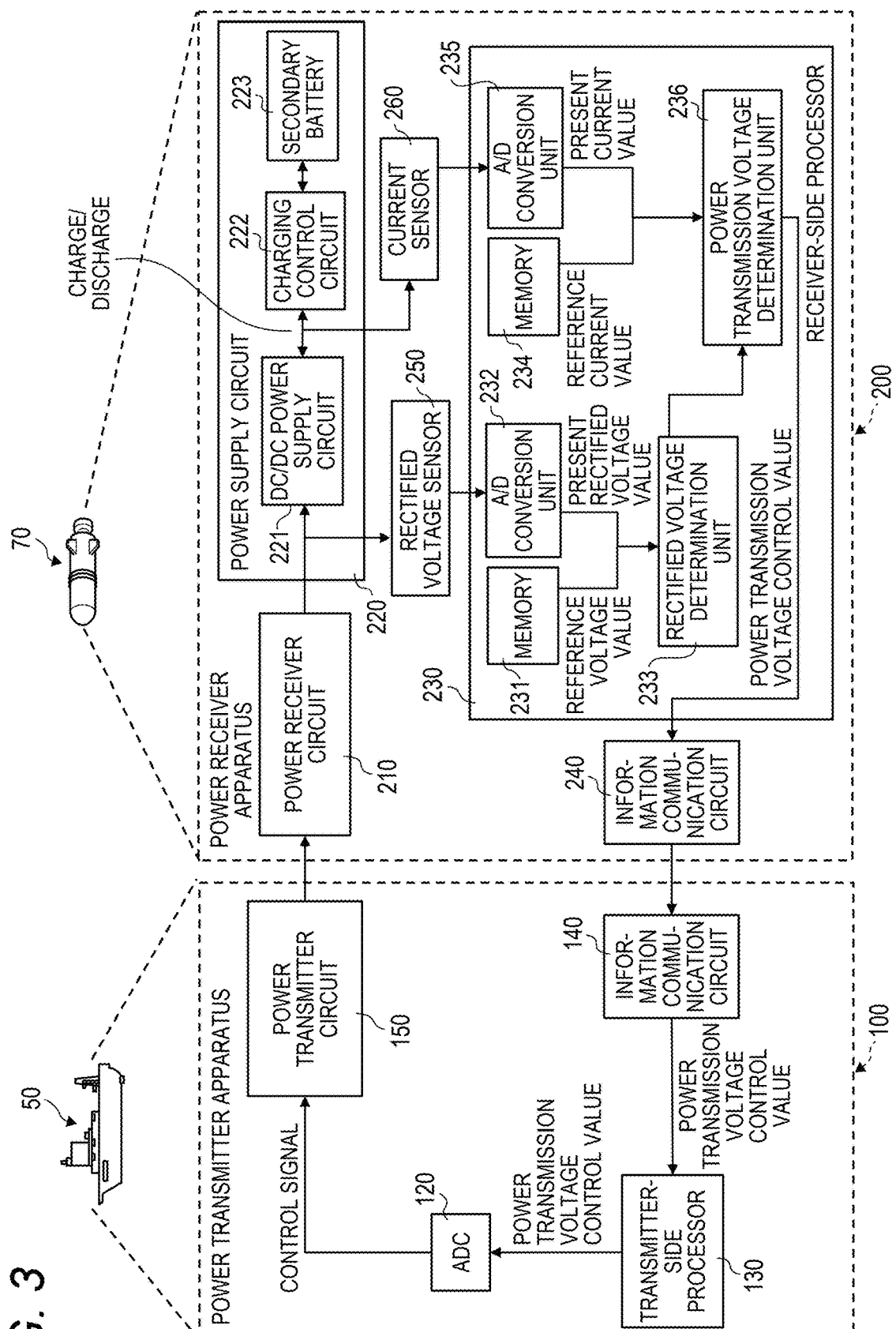
FIG. 3 is a block diagram showing a functional configuration example of a receiver-side processor in detail.

Next, a configuration example of the receiver-side processor 230 will be described with reference to FIG. 3. FIG. 3 is a block diagram showing a functional configuration example of the receiver-side processor 230. The receiver-side processor 230 includes a memory 231, an A/D conversion unit 232, a rectified voltage determination unit 233, a memory 234, an A/D conversion unit 235, and a power transmission voltage determination unit 236.

The memory 231 stores a reference voltage value Va, which is a lower limit of a voltage range serving as a guide (reference) for determining that the feedback control of the power transmission voltage from the primary side (that is, the power transmitter apparatus 100) needs to be performed, and a reference voltage value Vb, which is an upper limit of the voltage range. The reference voltage value Va is smaller than the reference voltage value Vb (Va<Vb, see FIG. 5).

The A/D conversion unit 232 converts a present rectified voltage value detected by the rectified voltage sensor 250 every time the periodic interrupt processing is performed into a digital value, and sends the rectified voltage value of the digital value to the rectified voltage determination unit 233.

The rectified voltage determination unit 233 compares the reference voltage values Va and Vb stored in the memory 231 with the present (latest) rectified voltage value converted by the A/D conversion unit 232, and determines whether the present rectified voltage value is smaller than the reference voltage value Va or larger than the reference voltage value Vb. The rectified voltage determination unit 233 sends a determination result as described above to the power transmission voltage determination unit 236.

The memory 234 stores a charging current value (see a table in FIG. 6) serving as a guide (reference) for determining the power transmission voltage control value when the feedback control of the power transmission voltage from the primary side (that is, the power transmitter apparatus 100) is performed.

The A/D conversion unit 235 converts the present charging current value detected by the current sensor 260 every time the periodic interrupt processing is performed into a digital value, and sends the charging current value of the digital value to the power transmission voltage determination unit 236.

When the determination result from the rectified voltage determination unit 233 is "the present rectified voltage value is smaller than the reference voltage value Va or larger than the reference voltage value Vb", the power transmission voltage determination unit 236 compares the table read from the memory 234 (see FIG. 6) with an output of the A/D conversion unit 235. The power transmission voltage determination unit 236 determines, based on a comparison result between the above described table (see FIG. 6) and the output of the A/D conversion unit 235, a power transmission voltage value to be feedback-controlled on the primary side (that is, the power transmitter apparatus 100). Here, with reference to FIG. 6, the charging current value serving as the guide (reference) for determining the power transmission voltage control value will be described.

FIG. 6 is a table showing an example of a correspondence relationship between the charging current value detected by the current sensor 260 and the power transmission voltage control value to be notified to the power transmitter apparatus 100. In the table, the charging current value detected by the current sensor 260 and an appropriate power transmission voltage control value to be feedback-controlled by the power transmitter apparatus 100 in accordance with the charging current value are registered in association with each other, and stored in, for example, the memory 234.

For example, when the rectified voltage value is smaller than the reference voltage value Va or larger than the reference voltage value Vb and the charging current value is "0 to I1", the power transmission voltage determination unit 236 determines that the power transmission voltage control value is "V1".

For example, when the rectified voltage value is smaller than the reference voltage value Va or larger than the reference voltage value Vb and the charging current value is "I1 to I2", the power transmission voltage determination unit 236 determines that the power transmission voltage control value is "V2".

For example, when the rectified voltage value is smaller than the reference voltage value Va or larger than the reference voltage value Vb and the charging current value is "I2 to I3", the power transmission voltage determination unit 236 determines that the power transmission voltage control value is "V3".

For example, when the rectified voltage value is smaller than the reference voltage value Va or larger than the reference voltage value Vb and the charging current value is "I3 to I4", the power transmission voltage determination unit 236 determines that the power transmission voltage control value is "V4".

For example, when the rectified voltage value is smaller than the reference voltage value Va or larger than the reference voltage value Vb and the charging current value is "I4 to I5", the power transmission voltage determination unit 236 determines that the power transmission voltage control value is "V5".

The information communication circuit 240 transmits the power transmission voltage control value determined by the power transmission voltage determination unit 236 to the information communication circuit 140 on the primary side (that is, the power transmitter apparatus 100). The information communication circuit 140 receives the power transmission voltage control value transmitted from the information communication circuit 240 on the secondary side (that is, the power receiver apparatus 200), and transmits the power transmission voltage control value to the transmitter-side processor 130. The transmitter-side processor 130 causes the ADC 120 to supply the DC power corresponding to the power transmission voltage control value to the power transmitter circuit 150 based on the power transmission voltage control value from the information communication circuit 140.

Figure 7:
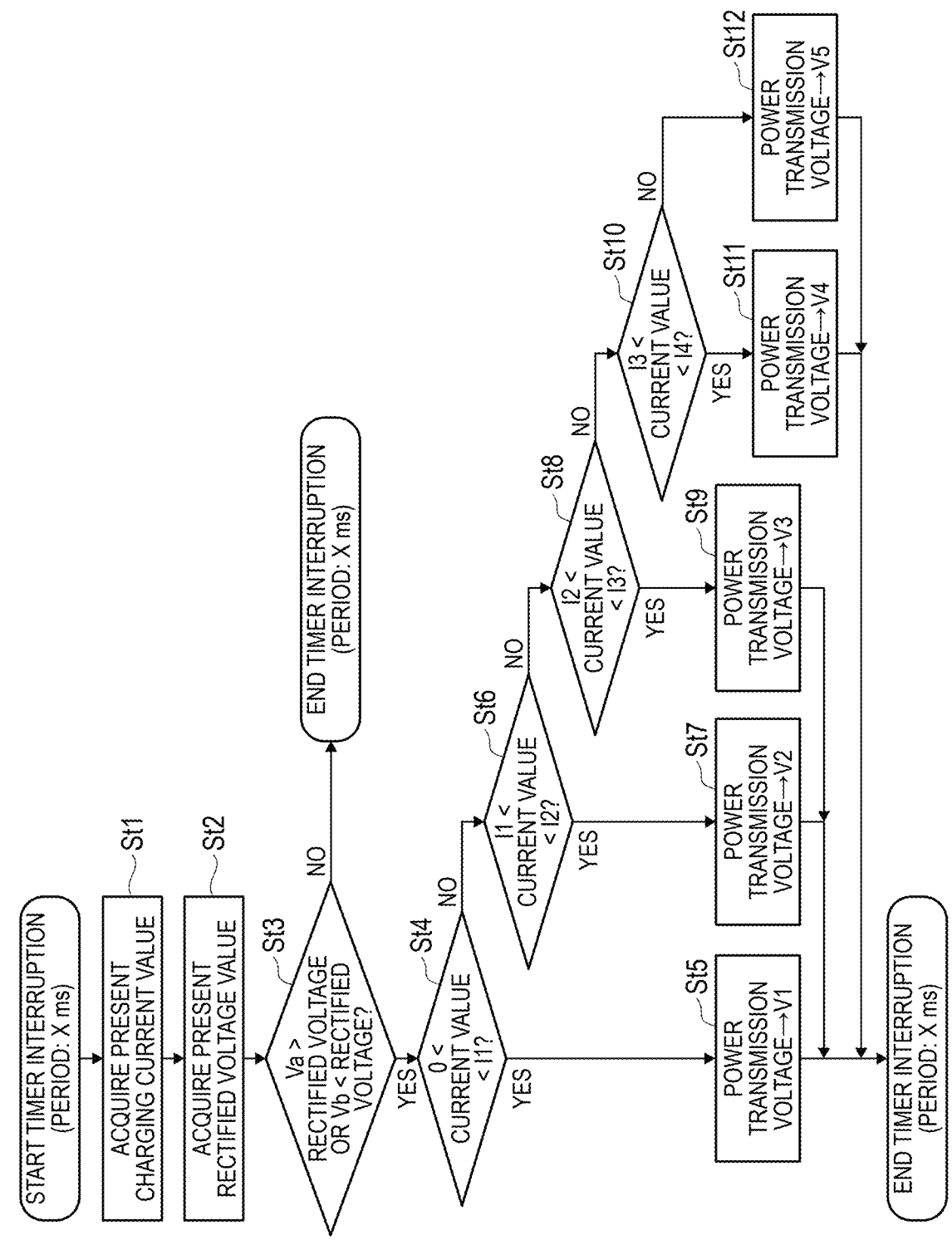
FIG. 7 is a flowchart showing an example of an operation procedure related to determination of the power transmission voltage of the power receiver apparatus according to the first embodiment.

Next, an example of an operation procedure related to the determination of the power transmission voltage control value from the power transmitter apparatus 100 in the power receiver apparatus 200 according to the first embodiment will be described with reference to FIG. 7. FIG. 7 is a flowchart showing an example of the operation procedure related to the determination of the power transmission voltage of the power receiver apparatus according to the first embodiment. The periodic interrupt processing in FIG. 7 is mainly executed by the receiver-side processor 230 at predetermined intervals (X milliseconds). X is, for example, 10.

In FIG. 7, the receiver-side processor 230 acquires a present charging current value detected by the current sensor 260 from the A/D conversion unit 235 (St1), and acquires a present rectified voltage value detected by the rectified voltage sensor 250 from the A/D conversion unit 232 (St2). The receiver-side processor 230 determines whether the present rectified voltage value acquired in step St2 is smaller than the reference voltage value Va or larger than the reference voltage value Vb (St3). When the receiver-side processor 230 determines that the present rectified voltage value is between the reference voltage value Va and the reference voltage value Vb (NO in St3), the present rectified voltage value is a value in a range in which the efficiency of the DC/DC power supply circuit 221 is the highest. Therefore, it is not necessary to change the present power transmission voltage, and the periodic interruption processing of the power receiver apparatus 200 ends.

When the receiver-side processor 230 determines that the present rectified voltage value is smaller than the reference voltage value Va or larger than the reference voltage value Vb (YES in St3), the present rectified voltage value is not a value in the range in which the efficiency of the DC/DC power supply circuit 221 is the highest. Therefore, the receiver-side processor 230 determines that it is necessary to change the power transmission voltage from the primary side (that is, the power transmitter apparatus 100) in accordance with the charging current value.

First, the receiver-side processor 230 determines whether the present charging current value acquired in step St1 is between 0 (zero) and I1 (St4, see FIG. 6). When the receiver-side processor 230 determines that the present charging current value is between 0 (zero) and I1 (YES in St4), the receiver-side processor 230 calculates and determines the power transmission voltage control value so that the power transmission voltage from the primary side (that is, the power transmitter apparatus 100) is V1 (St5). After step St5, the periodic interrupt processing of the power receiver apparatus 200 ends.

When the receiver-side processor 230 determines that the present charging current value is not between 0 (zero) and I1 (NO in St4), the receiver-side processor 230 determines whether the present charging current value acquired in step St1 is between I1 and I2 (St6, see FIG. 6). When the receiver-side processor 230 determines that the present charging current value is between I1 and I2 (YES in St6), the receiver-side processor 230 calculates and determines the power transmission voltage control value so that the power transmission voltage from the primary side (that is, the power transmitter apparatus 100) is V2 (St7). After step St7, the periodic interrupt processing of the power receiver apparatus 200 ends.

When the receiver-side processor 230 determines that the present charging current value is not between I1 and I2 (NO in St6), the receiver-side processor 230 determines whether the present charging current value acquired in step St1 is between I2 and I3 (St8, see FIG. 6). When the receiver-side processor 230 determines that the present charging current value is between I2 and I3 (YES in St8), the receiver-side processor 230 calculates and determines the power transmission voltage control value so that the power transmission voltage from the primary side (that is, the power transmitter apparatus 100) is V3 (St9). After step St9, the periodic interrupt processing of the power receiver apparatus 200 ends.

When the receiver-side processor 230 determines that the present charging current value is not between I2 and I3 (NO in St8), the receiver-side processor 230 determines whether the present charging current value acquired in step St1 is between I3 and I4 (St10, see FIG. 6). When the receiver-side processor 230 determines that the present charging current value is between I3 and I4 (YES in St10), the receiver-side processor 230 calculates and determines the power transmission voltage control value so that the power transmission voltage from the primary side (that is, the power transmitter apparatus 100) is V4 (St11). After step St11, the periodic interrupt processing of the power receiver apparatus 200 ends.

When the receiver-side processor 230 determines that the present charging current value is not between I3 and I4 (NO in St10), the receiver-side processor 230 calculates and determines the power transmission voltage control value so that the power transmission voltage from the primary side (that is, the power transmitter apparatus 100) is V5 (St12). After step St12, the periodic interrupt processing of the power receiver apparatus 200 ends.

As described above, the power receiver apparatus 200 according to the first embodiment is movable under water. The power transmitter apparatus 200 includes: a power receiver device (for example, the power receiver circuit 210) configured to receive power wirelessly transmitted from the power transmitter apparatus 100 under the water; a power supply device (for example, the power supply circuit 220) including a storage battery (for example, the secondary battery 223) and configured to charge the storage battery based on the received power received by the power receiver device; a first sensor (for example, the rectified voltage sensor 250) configured to detect a rectified voltage value rectified based on the received power; a second sensor (for example, the current sensor 260) configured to detect a charging current value to the storage battery charged by the power supply device; a processor (for example, the receiver-side processor 230) configured to determine a power transmission voltage value (for example, the power transmission voltage control value) corresponding to the power wirelessly transmitted from the power transmitter apparatus 100 based on the rectified voltage value detected by the first sensor and the charging current value detected by the second sensor; and a communication device (for example, the information communication circuit 240) configured to transmit the power transmission voltage value determined by the processor to the power transmitter apparatus 100.

A power transmission voltage control method according to the first embodiment is performed by the power receiver apparatus 200 movable under water. Specifically, the power transmission voltage control method includes: receiving power wirelessly transmitted from the power transmitter apparatus 100 under the water; charging, in a power supply device including a storage battery, the storage battery based on received power; detecting a rectified voltage value rectified based on the received power; detecting a charging current value to the storage battery charged by the power supply device; determining a power transmission voltage value corresponding to the power wirelessly transmitted from the power transmitter apparatus 100 based on the rectified voltage value and the charging current value; and transmitting the determined power transmission voltage value to the power transmitter apparatus 100.

The underwater power supply system 1000 according to the first embodiment includes: the power receiver apparatus 200 and the power transmitter apparatus 100 mounted in the underwater vehicle 70 movable underwater. The power receiver apparatus 200 includes a power receiver device configured to receive power wirelessly transmitted from the power transmitter apparatus 100 under the water; a power supply device including a storage battery and configured to charge the storage battery based on the received power received by the power receiver device; a first sensor configured to detect a rectified voltage value rectified based on the received power; a second sensor configured to detect a charging current value to the storage battery charged by the power supply device; a processor (for example, the receiver-side processor 230) configured to determine a power transmission voltage value corresponding to the power wirelessly transmitted from the power transmitter apparatus 100 based on the rectified voltage value detected by the first sensor and the charging current value detected by the second sensor; and a communication device configured to transmit the power transmission voltage value determined by the processor to the power transmitter apparatus 100. The power transmitter apparatus 100 controls the power to be wirelessly transmitted to the power receiver apparatus 200 based on the power transmission voltage value transmitted from the power receiver apparatus 200.

Accordingly, the underwater power supply system 1000 or the power receiver apparatus 200 can appropriately control the power transmission voltage from the primary side (that is, the power transmitter apparatus 100) to the secondary side (that is, the power receiver apparatus 200) in accordance with the charging current to the storage battery (for example, the secondary battery 223) mounted in the underwater vehicle 70 (that is, can control the rectified voltage value so that the efficiency of the power supply device mounted in the power receiver apparatus 200 is the highest). Therefore, the underwater power supply system 1000 or the power receiver apparatus 200 can prevent the efficiency deterioration of the DC/DC power supply on the secondary side (that is, the power receiver apparatus 200).

In a case in which the rectified voltage value detected by the first sensor is not within a predetermined range (for example, the range between the reference voltage values Va and Vb), the processor may be configured to determine the power transmission voltage value based on the charging current value detected by the second sensor. Accordingly, the underwater power supply system 1000 or the power receiver apparatus 200 can easily determine the power transmission voltage value in accordance with whether the rectified voltage value supplied to the power supply circuit 220 is between the reference voltage values Va and Vb, thereby reducing processing load.

The processor may be configured to hold the table (see FIG. 6) indicating the correspondence relationship between the charging current value detected by the second sensor and the power transmission voltage value, and determine the power transmission voltage value corresponding to the charging current value based on the table. Accordingly, the underwater power supply system 1000 or the power receiver apparatus 200 can easily determine the power transmission voltage control value in accordance with the charging current value, thereby reducing the processing load.

The power receiver apparatus 200 may configured to transmit the power transmission voltage value to the power transmitter apparatus 100 using power line communication (that is, power line communication (PLC)). Accordingly, even when the power receiver apparatus 200 and the power transmitter apparatus 100 are position-free, stable communication can be performed between the power transmitter apparatus 100 and the power receiver apparatus 200 by data communication via a power line.

Although various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in the above-described embodiments may be combined freely within a range not departing from the spirit of the invention.

In the present embodiment described above, the power receiver apparatus 200 may be a generator or the like installed on the seabed. In this case, the power receiver apparatus 200 is fixedly installed under the water. In this manner, in a structure fixedly installed on the seabed, even when it is difficult to move and charge the structure, since the power transmitter apparatus 100 approaches the power receiver apparatus 200, the power transmission efficiency under the water can be improved and the structure can be charged.

In the present embodiment described above, although the power transmitter coil CLA and the plurality of relay coils CLC are disposed in a lateral direction (horizontal direction) under the sea, the power transmitter coil CLA and the plurality of relay coils CLC may be disposed in a longitudinal direction (vertical direction). When the power transmitter coil CLA and the plurality of relay coils CLC are disposed in the longitudinal direction, surfaces of the power transmitter coil CLA and the relay coils CLC are substantially parallel to the water surface. When the power transmitter coil CLA and the plurality of relay coils CLC are disposed in the longitudinal direction, the power receiver coils CLB mounted on the underwater vehicle 70 may also be mounted in the longitudinal direction so as to match with a magnetic field direction. That is, a surface of the power receiver coil CLB may be substantially parallel to the water surface. When a power transmitter coil structure in which the power transmitter coil CLA and the relay coil CLC are connected to each other via a coupling body, the underwater vehicle 70 can enter and exit the power transmitter coil structure in the horizontal direction even when the power transmitter coil structure is disposed in the longitudinal direction. On the other hand, when the power transmitter coil structure in which the power transmitter coil CLA and the relay coil CLC are wound around the bobbin bn, when the power transmitter coil structure is disposed in the vertical direction, the underwater vehicle 70 may enter the inside of the power transmitter coil structure from openings of the bobbin bn positioned at an upper end and a lower end of the bobbin bn.

The present disclosure is useful as a power receiver apparatus, a power transmission voltage control method, and an underwater power supply system that appropriately control a power transmission voltage from a primary side to a secondary side in accordance with a charging current to a mounted storage battery and prevent efficiency deterioration of a DC/DC power supply on the secondary side.

The invention claimed is:

1. A power receiver apparatus movable under water, the power receiver apparatus comprising:
 a memory configured to store a plurality of charging current ranges and a plurality of power transmission voltage values, the plurality of charging current ranges increasing from a lowest current range to a highest current range, the plurality of power transmission voltage values increasing from a smallest power transmission voltage value to a largest power transmission voltage value, each of the plurality of charging current ranges being stored in association with one of the plurality of power transmission voltage values based on magnitude;
 a power receiver device configured to receive power wirelessly transmitted from a power transmitter apparatus under the water;
 a rectifier circuit configured to convert the power received by the power receiver device into a rectified voltage;
 a power supply device configured to charge a storage battery based on the rectified voltage, the rectified voltage being supplied by the rectifier circuit;
 a first sensor configured to detect a rectified voltage value of the rectified voltage;
 a second sensor configured to detect a charging current value to the storage battery, which is charged by the power supply device;
 a processor configured to:
  determine a reference voltage range based on the charging current value detected by the second sensor;
  determine that the rectified voltage value detected by the first sensor is outside the reference voltage range;
  in response to determining that the rectified voltage value is outside the reference voltage range, sequentially determine, for the plurality of charging current ranges in order of magnitude, whether the charging current value detected by the second sensor is within one of the plurality of charging current ranges; and
  in response to determining that the charging current value is within one of the plurality of charging current ranges, determine a corresponding one of the plurality of power transmission voltage values, which corresponds to the one of the plurality of charging current ranges; and
 a communication device configured to transmit the one of the plurality of power transmission voltage values determined by the processor to the power transmitter apparatus.

2. The power receiver apparatus according to claim 1,
 wherein, in a case in which the rectified voltage value detected by the first sensor is within the reference voltage range, the processor is configured to not determine the one of the plurality of power transmission voltage values based on the charging current value detected by the second sensor.

3. The power receiver apparatus according to claim 2,
 wherein the memory is configured to store a table indicating a correspondence relationship between the plurality of charging current ranges and the plurality of power transmission voltage values, and the processor is configured to determine the one of the plurality of power transmission voltage values corresponding to the charging current value based on the table.

4. The power receiver apparatus according to claim 1,
 wherein the communication device is configured to transmit the one of the plurality of power transmission voltage values to the power transmitter apparatus by using power line communication.

5. A power transmission voltage control method performed by a power receiver apparatus movable under water, the power transmission voltage control method comprising:
 storing a plurality of charging current ranges and a plurality of power transmission voltage values in a memory, the plurality of charging current ranges increasing from a lowest current range to a highest current range, the plurality of power transmission voltage values increasing from a smallest power transmission voltage value to a largest power transmission voltage value, each of the plurality of charging current ranges being stored in association with one of the plurality of power transmission voltage values based on magnitude;
 receiving power wirelessly transmitted from a power transmitter apparatus under the water;
 converting the received power into a rectified voltage;
 charging a storage battery based on the rectified voltage;
 detecting a rectified voltage value of the rectified voltage;
 detecting a charging current value to the storage battery, which is charged based on the rectified voltage;
 determining a reference voltage range based on the charging current value;
 determining that the rectified voltage value is outside the reference voltage range;
 in response to determining that the rectified voltage value is outside the reference voltage range, sequentially determining, for the plurality of charging current ranges in order of magnitude, whether the charging current value is within one of the plurality of charging current ranges;
 in response to determining that the charging current value is within one of the plurality of charging current ranges, determining a corresponding one of the plurality of power transmission voltage values, which corresponds to the one of the plurality of charging current ranges; and
 transmitting the one of the plurality of power transmission voltage values to the power transmitter apparatus.

6. An underwater power supply system, comprising:
 a power receiver apparatus movable under water; and
 a power transmitter apparatus,
 wherein the power receiver apparatus comprises:
  a memory configured to store a plurality of charging current ranges and a plurality of power transmission voltage values, the plurality of charging current ranges increasing from a lowest current range to a highest current range, the plurality of power transmission voltage values increasing from a smallest power transmission voltage value to a largest power transmission voltage value, each of the plurality of charging current ranges being stored in association with one of the plurality of power transmission voltage values based on magnitude;

a power receiver device configured to receive power wirelessly transmitted from the power transmitter apparatus under the water;

a rectifier circuit configured to convert the power received by the power receiver device into a rectified voltage;

a power supply device configured to charge a storage battery based on the rectified voltage, the rectified voltage being supplied by the rectifier circuit;

a first sensor configured to detect a rectified voltage value of the rectified voltage;

a second sensor configured to detect a charging current value to the storage battery, which is charged by the power supply device;

a processor configured to:
  determine a reference voltage range based on the charging current value detected by the second sensor;
  determine that the rectified voltage value detected by the first sensor is outside the reference voltage range;
  in response to determining that the rectified voltage value is outside the reference voltage range, sequentially determine, for the plurality of charging current ranges in order of magnitude, whether the charging current value detected by the second sensor is within one of the plurality of charging current ranges; and
  in response to determining that the charging current value is within one of the plurality of charging current ranges, determine a corresponding one of the plurality of power transmission voltage values, which corresponds to the one of the plurality of charging current ranges; and a communication device configured to transmit the one of the plurality of power transmission voltage values determined by the processor to the power transmitter apparatus, and wherein the power transmitter apparatus is configured to control the power to be wirelessly transmitted to the power receiver apparatus based on the one of the plurality of power transmission voltage values transmitted from the power receiver apparatus.

* * * * *